(12) United States Patent
Hamaguchi et al.

(10) Patent No.: US 8,229,665 B2
(45) Date of Patent: Jul. 24, 2012

(54) VEHICLE CONTROL APPARATUS FOR AVOIDING CONTACT WITH OBSTACLE LOCATING BACKWARD

(75) Inventors: Youji Hamaguchi, Zama (JP); Yoji Seto, West Bloomfield, MI (US); Takuya Inoue, Sagamihara (JP); Masahiro Kobayashi, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 378 days.

(21) Appl. No.: 12/510,514

(22) Filed: Jul. 28, 2009

(65) Prior Publication Data

US 2010/0030439 A1 Feb. 4, 2010

Related U.S. Application Data

(60) Provisional application No. 61/084,418, filed on Jul. 29, 2008.

(51) Int. Cl.
*G06F 17/10* (2006.01)
(52) U.S. Cl. .......................................... 701/301; 701/70
(58) Field of Classification Search .................... 701/36, 701/41, 70, 300, 301; 340/932.2
See application file for complete search history.

(56) References Cited

U.S. PATENT DOCUMENTS

| | | | |
|---|---|---|---|
| 6,424,895 B1* | 7/2002 | Shimizu et al. | 701/41 |
| 6,583,403 B1* | 6/2003 | Koike et al. | 250/221 |
| 7,248,153 B2* | 7/2007 | Danz et al. | 340/435 |
| 7,277,123 B1* | 10/2007 | Okamoto et al. | 348/148 |
| 7,344,205 B2* | 3/2008 | Kamiya et al. | 303/124 |
| 7,358,864 B2* | 4/2008 | Mori et al. | 340/932.2 |
| 8,018,488 B2* | 9/2011 | Yuasa | 348/118 |
| 2002/0038171 A1* | 3/2002 | Deguchi et al. | 701/41 |
| 2003/0151526 A1* | 8/2003 | Tanaka et al. | 340/932.2 |
| 2005/0122234 A1* | 6/2005 | Danz et al. | 340/932.2 |
| 2006/0185921 A1* | 8/2006 | Cieler et al. | 180/204 |
| 2006/0287826 A1* | 12/2006 | Shimizu et al. | 701/216 |
| 2007/0027598 A1* | 2/2007 | Mori et al. | 701/41 |
| 2007/0057816 A1* | 3/2007 | Sakakibara et al. | 340/932.2 |
| 2007/0088474 A1* | 4/2007 | Sugiura et al. | 701/36 |
| 2007/0282499 A1* | 12/2007 | Maeda et al. | 701/41 |
| 2008/0007618 A1* | 1/2008 | Yuasa | 348/118 |
| 2009/0018723 A1* | 1/2009 | Chevion et al. | 701/36 |

FOREIGN PATENT DOCUMENTS

JP 2004-351992 A 12/2004

OTHER PUBLICATIONS

English translation of JP 2004-351992 A, Dec. 16, 2004.

* cited by examiner

*Primary Examiner* — Helal A Algahaim
(74) *Attorney, Agent, or Firm* — Foley & Lardner LLP

(57) ABSTRACT

There is disclosed a vehicle control processing when a vehicle backs up. According to this vehicle control processing, a controller backs the vehicle toward an obstacle step by step by repeating execution of back control processing for backing the vehicle to a halt at a target stop position, which is set on the obstacle side of the vehicle, until a distance from the vehicle to the obstacle becomes equal to or less than a final target stop position. Thus, it prevents the vehicle driver from failing to park the vehicle at an appropriate position and feeling a lot of trouble during vehicle control as experienced by the vehicle driver in the conventional vehicle control apparatus.

9 Claims, 4 Drawing Sheets

VEHICLE CONTROL APPARATUS FOR AVOIDING CONTACT WITH OBSTACLE LOCATING BACKWARD

BACKGROUND OF THE INVENTION

1. Field of the Invention

The present invention relates to a vehicle control apparatus for avoiding contact between a vehicle and an obstacle located in the rear of the vehicle.

2. Description of the Related Art

As disclosed in JP2004-351992A, conventionally, there is known a vehicle control apparatus configured to avoid contact between the vehicle and an obstacle detected by a sensor by stopping the vehicle forcibly when a distance between the vehicle and the detected obstacle becomes equal to or less than a predetermined distance. According to this conventional vehicle control apparatus, when the vehicle driver backs a vehicle into a garage and parks it, the vehicle driver cannot stop the vehicle at an appropriate position if a long distance is set for the predetermined distance because the vehicle stops before rear wheels come into contact with a car catch arranged within the garage. In addition, the vehicle driver feels a lot of trouble when backing the vehicle into the garage if adversely a short distance is set for the predetermined distance because the rear wheels come into contact with the car catch.

SUMMARY OF THE INVENTION

A vehicle control apparatus according to the present invention backs a vehicle toward an obstacle step by step by repeating multiple times execution of control processing for backing the vehicle until the vehicle reaches a predetermined distance to the obstacle located in the rear or the side of the vehicle.

BRIEF DESCRIPTION OF THE DRAWINGS

Examples of the invention will become more fully apparent from the following description and appended claims, taken in conjunction with the accompanying drawings. Understanding that these drawings depict only examples and are, therefore, not to be considered limiting of the invention's scope, the examples of the invention will be described with additional specificity and detail through use of the accompanying drawings in which:

DETAILED DESCRIPTION OF THE INVENTION

Figure 1:
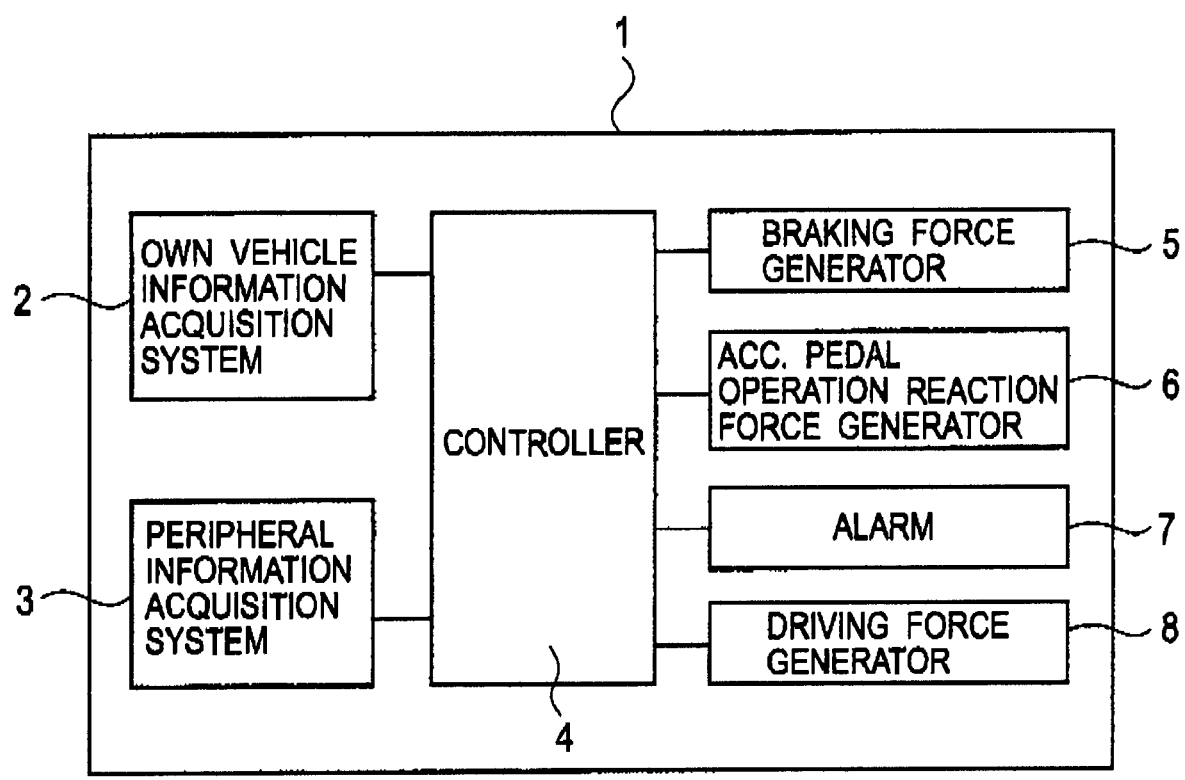
FIG. 1 is a block diagram showing the constitution of an implementation of a vehicle control apparatus according to the present invention.

Hereinafter, referring to the drawings, there is explained an implementation of a vehicle control apparatus according to the present invention.

[Constitution of Vehicle Control Apparatus]

Figure 2:
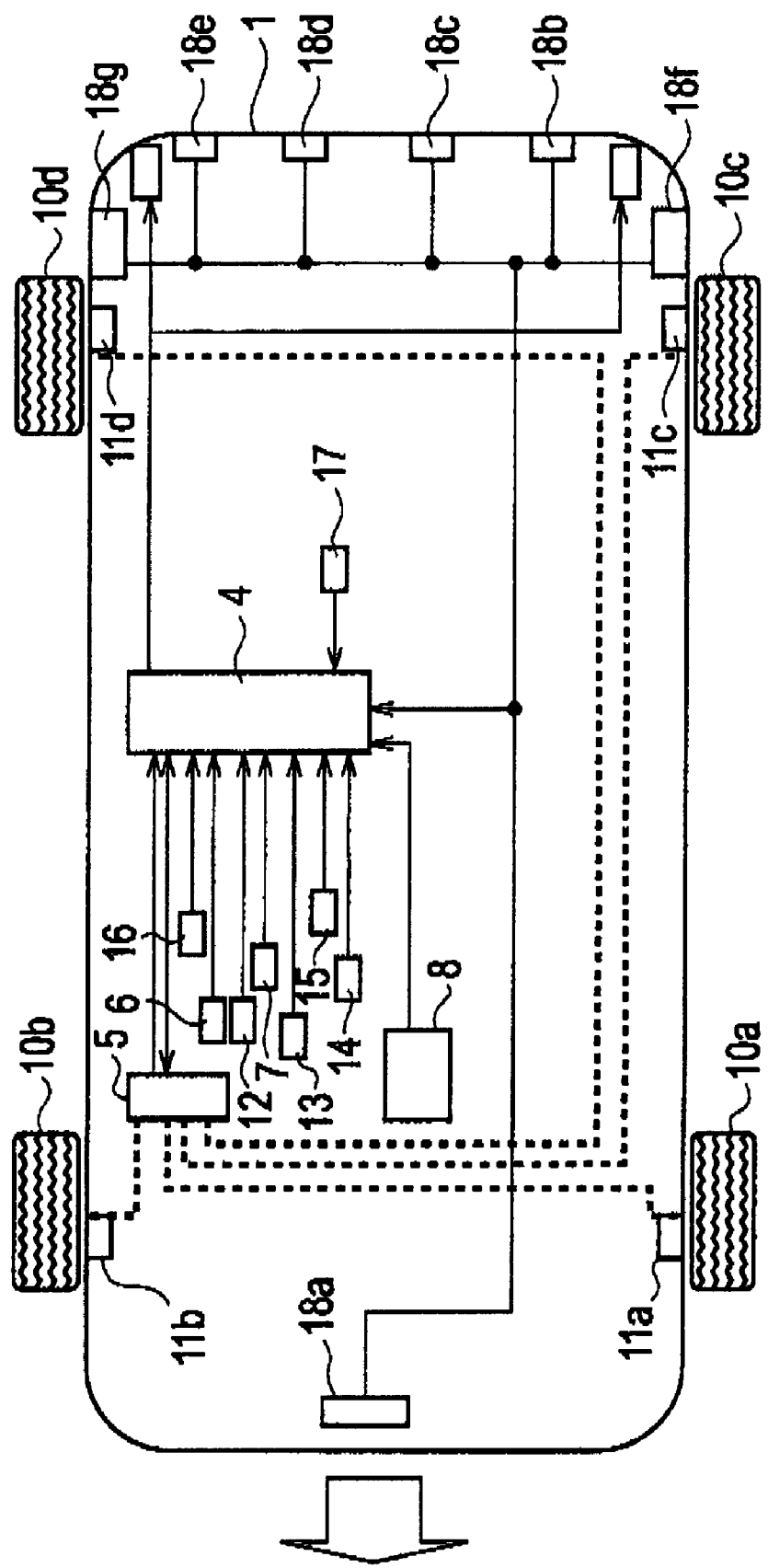
FIG. 2 is a schematic diagram showing an example of a vehicle layout of the vehicle control apparatus shown in FIG. 1.

As shown in FIG. 1, the implementation of the vehicle control apparatus, which is carried by a vehicle 1, according to the present invention comprises, as major constituent elements, an own vehicle information acquisition system 2, a peripheral information acquisition system 3, a controller 4, a braking force generator 5, an accelerator pedal operation reaction force generator 6, an alarm 7, and a driving force generator 8. As shown in FIG. 2, the own vehicle information acquisition system 2 comprises wheel speed (vehicle speed) sensors 11*a*, 11*b*, 11*c*, and 11*d*, which are installed in driving wheels 10*a*, 10*b*, 10*c*, and 10*d* of the vehicle 1, respectively, an accelerator pedal opening degree sensor 12, which is installed in an accelerator pedal of the vehicle 1, a brake pedal switch 13, which is installed in a brake pedal of the vehicle 1, a shift position sensor 14 so constructed and arranged as to detect a position of a transmission (a shift position), a switch sensor 15 so constructed and arranged as to detect a state of a switch for turning on or off a vehicle controller installed in the vehicle 1, a steering sensor 18 so constructed and arranged as to detect a steering angle of a steering wheel of the vehicle 1, and an acceleration and deceleration sensor 17 so constructed and arranged as to detect acceleration or deceleration of the vehicle 1. Utilizing these sensors and switches, the own vehicle information acquisition system 2 acquires, as own vehicle information, wheel speeds (vehicle speed) of the vehicle 1, an accelerator pedal opening degree, an on or off state of the brake pedal, a shift position, a state of the switch for turning on or off the vehicle controller, a steering angle of the steering wheel, and acceleration or deceleration.

As shown in FIG. 2, the peripheral information acquisition system 3 comprises obstacle detection sensors 18*a*, 18*b*, 18*c*, 18*d*, 18*e*, 18*f*, and 18*g*, which are installed in a front portion, rear portions and rear side portions of the vehicle 1 to acquire, as peripheral information, whether there is any obstacle located in an area in front of or in rear of or on rear side of the vehicle 1, a relative distance and a relative speed of the vehicle 1 to the obstacle, and a detected angle, i.e., an angle at which the concerned obstacle detection sensor detects or views the obstacle. The controller 4 comprises an arithmetic and control unit such as an ECU (Electronic Control Unit) and controls movement of the whole vehicle control apparatus by a CPU in the arithmetic and control unit carrying out computer program(s) stored beforehand.

The brake force generator 5 controls brakes pressures of the vehicle 1 according to control of the controller 4. The accelerator pedal operation reaction force generator 6 controls a reaction force via the accelerator pedal according to control of the controller 4. The alarm 7 controls on/off of an alarm output according to control of the controller 4. The driving force generator 8 controls engine output of the vehicle 1 according to control of the controller 4.

The vehicle control apparatus, which has such a constitution, backs the vehicle while avoiding a contact with an obstacle located in rear of the vehicle by execution of the vehicle control processing (back control processing) to be shown below when the vehicle backs up. Referring to a flow chart shown in FIG. 3, the following description explains how the vehicle control apparatus works upon carrying out the vehicle control processing.

[Vehicle Control Processing]

Figure 3:
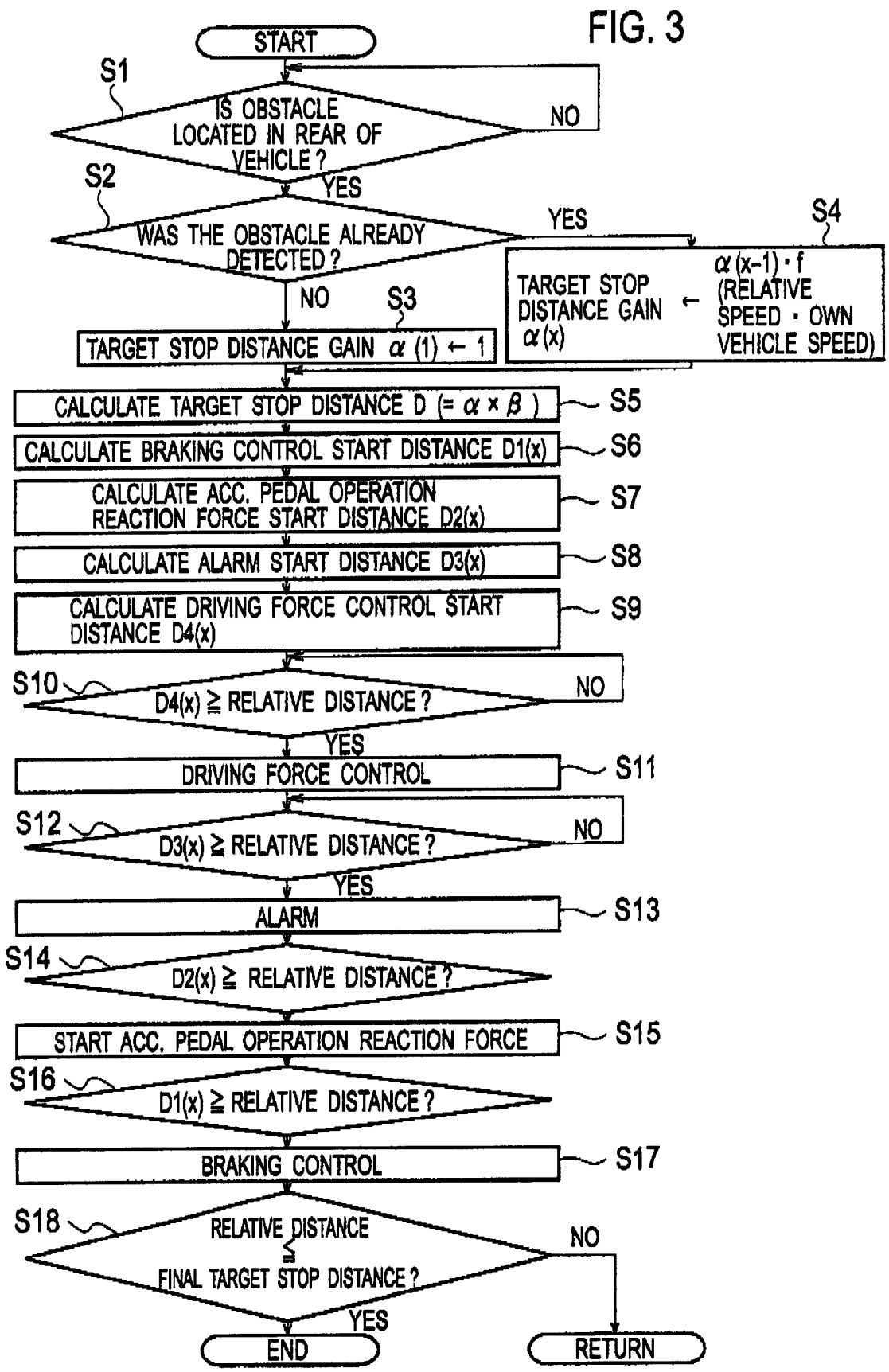
FIG. 3 is a flowchart showing a flow of an implementation of a vehicle control processing according to the present invention.

The flow chart shown in FIG. 3 starts at the timing when the controller 4 makes a decision that the switch for turning on or off the vehicle controller is in its on state and the shift position of the vehicle 1 is placed in R (back) position based on the own vehicle information which is acquired by the own vehicle information acquisition system 2, and the vehicle control processing advances for processing of step S1. In addition, this vehicle control processing is carried out every predetermined period until a distance between the vehicle 1 and an obstacle becomes a predetermined distance (a final target stop distance) as long as the switch for turning on or off the vehicle controller is in its on state and the shift position of the vehicle 1 is placed in R position. In addition, conditions for the start timing of the vehicle control processing are not limited to the above ones, and, as well as the above conditions, you may add conditions that the vehicle speed is less than or equal to a predetermined value and a steering angle of the steering wheel is less than or equal to a predetermined value.

According to the processing of step S1, the controller 4 determines whether or not there is any obstacle located in rear of or on either side of the vehicle 1 based on peripheral information acquired by the peripheral information acquisition system 3. And the controller 4 carries the vehicle control processing forward to processing of step S2 at the timing when the determined result indicates that there is an obstacle located in rear of or on either side of the vehicle 1.

According to the processing of step S2, the controller 4 determines whether or not the obstacle detected by the processing of step S1 this time is the same as one detected by the vehicle control processing last time based on a relative speed between the vehicle 1 and the detected obstacle. Specifically, the controller 4 calculates a deviation of a this time value of a relative speed between the vehicle 1 and the obstacle detected this time from a last time value of a relative speed between the vehicle 1 and the obstacle detected last time, and determines that the obstacle detected by the processing of step S1 this time is the same as the obstacle detected by the vehicle control processing last time when the calculated deviation is less than or equal to a threshold γ (gamma). As a result of this determination, the controller 4 carries the vehicle control processing forward to processing of step S4 when the obstacle detected by the processing of step S1 this time is the same as the obstacle detected by the vehicle control processing last time or, in other words, when the number of times this vehicle control processing has been carried out for the obstacle detected this time amounts to two or more. On the other hand, the controller 4 carries the vehicle control processing forward to processing of step S3 when the obstacle detected by the processing of step S1 this time is an obstacle detected for the first time or, in other words, when the number of times this vehicle control processing has been carried out for the obstacle detected this time amounts to one.

According to the processing of step S3, the controller 4 sets the value 1 as a target stop distance gain α(x) (x: the continuous number of times the vehicle control processing has been carried out for the same obstacle) for the obstacle detected by the processing of step S1. By this, the processing of step S3 is completed, and the vehicle control processing advances for processing of step S5.

According to the processing of step S4, the controller 4 sets, as the target stop distance gain α(x), the value given by multiplying the target stop distance gain α(x−1) set by the vehicle control processing last time with the value of a function f(relative speed, own vehicle speed), which is a function of a relative speed associated with the detected obstacle and a vehicle speed of the vehicle 1 and gives various values less than 1. In other words, the controller 4 sets, as the target stop distance gain α(x), the value less than 1 or less than the target stop distance gain α(x−1) that was set by the vehicle control processing last time. By this, the processing of step S4 is completed. And the vehicle control processing advances for processing of step S5.

Figure 4:
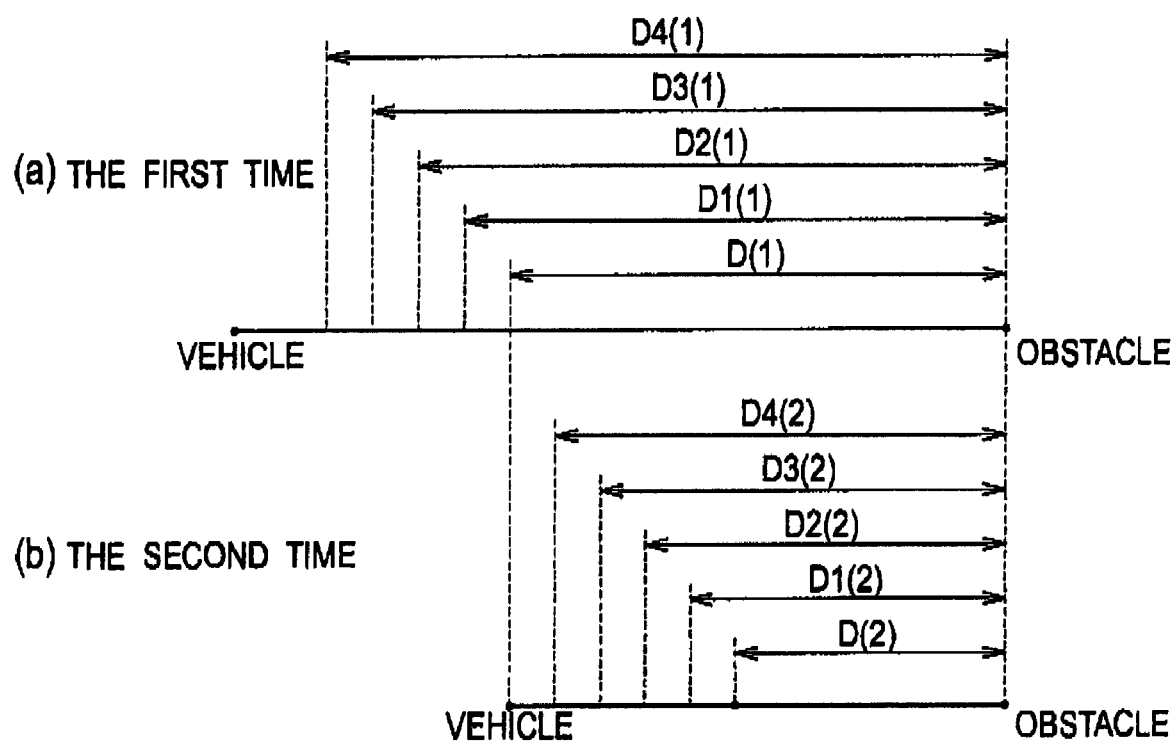
FIG. 4 is a diagram showing the notion of the vehicle control processing shown in FIG. 3.

According to the processing of step S5, the controller 4 gives a value resulting from multiplying the target stop distance gain α(x), which has been set by the processing of step S3 or step S4, with a predetermined distance β (for example, 1 m) as a target stop distance D(x) for the obstacle detected by the processing of step S1. Here, the target stop distance D(x) is a distance from an obstacle to a target position (namely, a target stop position) which the vehicle 1 is to stop at. The target stop position comes close to the obstacle with the increase of the number of times the vehicle control processing has been carried out for the same obstacle because, as stated above, the target stop distance gain a for the same obstacle decreases with the increase of the number of times the vehicle control processing has been carried out for the obstacle continuously and, as shown in FIG. 4, the target stop distance D(x) for the same obstacle decreases with the increase of the number of times the vehicle control processing has been carried out for the obstacle continuously. In addition, it is desirable to set the lower limit value for the target stop distance D(x) and keep the target stop distance D(x) not to become less then or equal to the lower limit value. By this, the processing of step S5 is completed, and the vehicle control processing advances for processing of step S6.

According to the processing of step S8, the controller 4 calculates a braking control start distance D1(x), namely, a distance from the obstacle to a position at which control of the brakes pressure of the vehicle 1 begins, by adding a vehicle speed dependent working distance to the target stop distance D(x) calculated by the processing of step S5. Further, the vehicle speed dependent working distance, which is a value that increases with an increase in vehicle speed, means a distance over which the vehicle 1 moves to a halt at the target stop position after beginning of the braking control. In addition, the controller 4 may modify the vehicle dependent working distance based on time headway (THW) that Is given, via arithmetic operation, by a relative distance and a relative speed to an obstacle. By this, processing of step S6 is completed, and the vehicle control processing advances for processing of step S7.

According to the processing of step S7, the controller 4 calculates an accelerator pedal operation reaction force start distance D2(x), namely, a distance from the obstacle to a position at which control of the accelerator pedal operation reaction force of the vehicle 1 begins, by adding a vehicle dependent idle running distance to the braking control start distance D1(x) calculated by the processing of step S6. Further, the idle running distance, which is added at the processing of this step S7, is set depending on the vehicle speed such that the generation timing of accelerator pedal operation reaction force is before the braking control start timing and after the start timing for the alarm 7. In other words, the idle running distance is set equal to or less than an idle running distance for processing of step 8 such that the accelerator pedal operation reaction force start distance D2(x) is greater than or equal to the braking control start distance D1(x) but equal to or less than an alarm start distance D3(x) to be described later. By this, the processing of step S7 is completed, and the vehicle control processing advances for processing of step S8.

According to the processing of step S8, the controller 4 calculates an alarm start distance D3(x), namely, a distance from the obstacle to a position at which an alarm activation for alarming the existence of the obstacle begins, by adding a vehicle dependent idle running distance to the braking control start distance D1(x) calculated by the processing of step S6. Further, the idle running distance, which is added at the processing of this step S8, is set depending on the vehicle speed such that the start timing for the alarm 7 is before the generation timing of accelerator pedal operation reaction force and after a driving force control start timing by the driving force generator 8 to be described later. In other words, the idle running distance is greater than the idle running distance for processing of step S7 but less than or equal to an idle running distance for processing of step 9 such that the alarm start distance $D3(x)$ is greater than or equal to the accelerator pedal operation reaction force start distance $D2(x)$ but equal to or less than a driving force control start distance $D4(x)$ to be described later. By this, the processing of step S8 is completed, and the vehicle control processing advances for processing of step S9.

According to the processing of step S9, the controller 4 calculates a driving force control start distance $D4(x)$, namely, a distance from the obstacle to a position at which engine output control of the vehicle 1 begins, by adding a vehicle dependent idle running distance to the braking control start distance $D1(x)$ calculated by the processing of step S6. Further, the idle running distance, which is added at the processing of this step S9, is set greater than the idle running distance in the processing of step S6 such that the driving force control start distance $D4(x)$ is greater than the alarm start distance $D3(x)$. By this, the processing of step S9 is completed, and the vehicle control processing advances for processing of step S10.

According to the processing of step S10, the controller 4 determines whether or not the relative distance to the obstacle detected by the peripheral information acquisition system 3 is less than or equal to the driving force control start distance $D4(x)$ calculated by the processing of step S9. Then, the controller 4 allows the vehicle control processing to advance for processing of step S11 at the timing when the relative distance to the obstacle detected by the peripheral information acquisition system 3 becomes equal to or less than the driving force control start distance $D4(x)$.

According to the processing of step S11, the controller 4 controls the driving force generator 8 such that a drop of throttle opening degree increases at a predetermined rate of change and the drop of throttle opening degree is kept unaltered at and after the timing when it reaches a predetermined value in the drop of throttle opening degree. After a predetermined time has passed from this timing, the drop of throttle opening degree decreases to 0 (zero). In addition, the predetermined rate of change and the predetermined value in the drop of throttle opening degree may change depending on vehicle speed and time headway associated with the detected obstacle. In addition, in the case of this processing, the final throttle opening degree for the engine is given by subtracting the drop of throttle opening degree from a throttle opening degree determined depending on an accelerator opening degree of an accelerator pedal operated by the vehicle driver. By this, the processing of step S11 is completed, and the vehicle control processing advances for processing of step S12.

According to the processing of step S12, the controller 4 determines whether or not the relative distance to the obstacle detected by the peripheral information acquisition system 3 is less than or equal to the alarm start distance $D3(x)$ calculated by the processing of step S8. Then, the controller 4 allows the vehicle control processing to advance for processing of step S13 at the timing when the relative distance to the obstacle detected by the peripheral information acquisition system 3 becomes equal to or less than the alarm start distance $D3(x)$.

According to the processing of step S13, the controller 4 controls the alarm 7 such that it outputs a warning (a buzzer) to transmit the existence of the obstacle to the vehicle driver. By this, the processing of step S13 is completed, and the vehicle control processing advances for processing of step S14.

According to the processing of step S14, the controller 4 determines whether or not the relative distance to the obstacle detected by the peripheral information acquisition system 3 is less than or equal to the accelerator pedal operation reaction force start distance $D2(x)$ calculated by the processing of step S7. Then, the controller 4 allows the vehicle control processing to advance for processing of step S15 at the timing when the relative distance to the obstacle detected by the peripheral information acquisition system 3 becomes equal to or less than the accelerator pedal operation reaction force start distance $D2(x)$.

According to the processing of step S15, the controller 4 controls the accelerator pedal operation reaction force generator 6 such that an accelerator pedal operation reaction force increases at a predetermined rate of change and the accelerator pedal operation reaction force is kept unaltered at and after the timing when it reaches a predetermined value in the accelerator pedal operation reaction force. In addition, the predetermined rate of change and the predetermined value in the accelerator pedal operation reaction force may change depending on vehicle speed and time headway associated with the detected obstacle. By this the processing of step S15 is completed and the vehicle control processing advances for processing of step S16.

According to the processing of step S16, the controller 4 determines whether or not the relative distance to the obstacle detected by the peripheral information acquisition system 3 is less than or equal to the braking control start distance $D1(x)$ calculated by the processing of step S6. Then, the controller 4 allows the vehicle control processing to advance for processing of step S17 at the timing when the relative distance to the obstacle detected by the peripheral information acquisition system 3 becomes equal to or less than the braking control start distance $D1(x)$.

According to the processing of step S17, the controller 4 controls the brakes force generator 5 such that a target brake pressure increases at a predetermined rate of change and the target brake pressure is kept unaltered at and after the timing when it reaches a predetermined value in the target brake pressure until the vehicle speed becomes 0 (zero). Then, the controller 4 causes the brake pressure to decrease at a predetermined rate of change to 0 (zero) upon expiration of a predetermined time after the vehicle speed becoming 0 (zero). In addition, the controller 4 may alter the target brake pressure and its rate of change depending on vehicle speed and the distance to the detected obstacle. By this, the processing of step S17 is completed and the vehicle control processing advances for processing of step S18.

According to the processing of step S18, the controller 4 determines whether or not a relative distance (i.e., a target stop distance $D(x)$) between the vehicle, which has come to a halt, and the obstacle is less than or equal to a predetermined distance (a final stop distance) Then, the controller 4 finishes a series of vehicle control processing when the result of the above-mentioned determination indicates that the relative distance between the vehicle 1 and the obstacle becomes equal to or less than the final stop distance. On the other hand, the controller 4 allows the vehicle control processing to return to the processing of step S1 when the relative distance between the vehicle 1 and the obstacle is greater than the final stop distance.

As is clear from the above-mentioned explanation, when a vehicle 1 backs up, in the implementation of a vehicle control apparatus according to the present invention, a controller 4 backs the vehicle toward an obstacle step by step by repeating execution of back control processing for backing the vehicle to a halt at a target stop position, which is set on the obstacle side of the vehicle 1, until a distance from the vehicle 1 to the obstacle becomes equal to or less than the final target stop position, thus preventing the vehicle driver from failing to park the vehicle at an appropriate position and feeling a lot of trouble during vehicle control as experienced by the vehicle driver in the conventional vehicle control apparatus.

In addition, in the implementation of a vehicle control processing, a controller 4 shortens a target stop distance D(x) depending on an increase in number of times of execution of a control processing when it determines that an obstacle detected is the same as the obstacle detected at the last time of control processing, thus allowing the driver to back and park the vehicle 1 at a position nearer the obstacle.

As stated above, the implementation, in which the present invention is applied by the inventor(s), has been explained, but the description and drawings, which form a part of the disclosure of the present invention, are not intended to limit the present invention. In other words, any other implementations, embodiments and application technology made by a person skilled in the art based on the preferred implementation are all included in the category of the present invention.

What is claimed is:

1. A vehicle control apparatus comprising:
    an obstacle recognition system that detects an obstacle in the rear of an own vehicle and detects at least a distance from the own vehicle to the obstacle;
    a back control system that repeats execution of a back control processing, which, when the own vehicle is to back up, backs the own vehicle to a halt at a target stop position set on the side of the obstacle from the own vehicle, until the distance, detected by said obstacle recognition system, from the own vehicle to the obstacle becomes equal to a predetermined final target stop distance; and
    a target stop distance setting section that sets a target stop distance, which is a distance from said obstacle to said target stop position, the target stop distance setting section setting said target stop distance, which is longer than said predetermined final target stop distance, at a first execution of said back control processing, and shortening said target stop distance depending on an increase in the number of times of execution of said back control processing to cause the target stop distance to approach the predetermined final target stop distance.

2. The vehicle control apparatus as recited in claim 1, further comprising a determination section that determines whether or not an obstacle detected by said obstacle recognition system is the same as an obstacle detected last time by said obstacle recognition system, the target stop distance setting section shortening said target stop distance depending on the increase in the number of times of execution of said back control processing only when it is determined by said determination section that the detected obstacle is the same as the obstacle detected last time.

3. The vehicle control apparatus as recited in claim 2, further comprising an operation reaction force control section that controls an operation reaction force via an accelerator pedal of the own vehicle, the operation reaction force control section causing generation of operation reaction force via the accelerator pedal when the distance from the own vehicle to the obstacle becomes equal to or less than a first distance that is a predetermined distance further from the obstacle than the target stop distance.

4. The vehicle control apparatus as recited in claim 3, wherein said first distance is given by adding a second distance that is a predetermined distance determined beforehand to said target stop distance.

5. The vehicle control apparatus as recited in claim 3, further comprising an alarm giving an alarm to a vehicle driver of the own vehicle, said alarm in giving the alarm to the vehicle driver when the distance from the own vehicle to the obstacle becomes equal to or less than a third distance that is a predetermined distance further from the obstacle than said first distance.

6. The vehicle control apparatus as recited in claim 5, wherein said third distance is given by adding a fourth distance that is longer than a second distance to said target stop distance.

7. A vehicle control method comprising:
    detecting, by an obstacle recognition system, an obstacle in the rear of an own vehicle to detect at least a distance from the own vehicle to the obstacle;
    repeating, by a back control system, execution of a back control processing, which, when the own vehicle is to back up, backs the own vehicle to a halt at a target stop position set on the side of the obstacle from the own vehicle, until the distance from the own vehicle to the obstacle becomes equal to a predetermined final target stop distance; and
    setting, by a target stop distance setting section, a target stop distance, which is a distance from said obstacle to said target stop position, the target stop distance setting section setting said target stop distance, which is longer than said predetermined final target stop distance, at a first execution of said back control processing, and shortening said target stop distance depending on an increase in the number of times of execution of said back control processing to cause the target stop distance to approach the predetermined final target stop distance.

8. The vehicle control method as recited in claim 7, further comprising determining, by a determination section, whether or not an obstacle detected by said obstacle recognition system is the same as an obstacle detected last time by said obstacle recognition system, the target stop distance setting section shortening said target stop distance depending on the increase in the number of times of execution of the back control processing only when it is determined by said determination section that the detected obstacle is the same as the obstacle detected last time.

9. A vehicle control apparatus comprising:
    means for detecting an obstacle in the rear of an own vehicle to detect at least a distance from the own vehicle to the obstacle;
    means for repeating execution of a back control processing, which, when the own vehicle is to back up, backs the own vehicle to a halt at a target stop position set on the side of the obstacle from the own vehicle, until the distance from the own vehicle to the obstacle becomes equal to a predetermined final target stop distance; and
    means for setting a target stop distance, which is a distance from said obstacle to said target stop position, said means for setting the target stop distance setting said target stop distance, which is longer than said predetermined final target stop distance, at a first execution of said back control processing, and shortening said target stop distance depending on an increase in the number of times of execution of said back control processing to cause the target stop distance to approach the predetermined final target stop distance.

* * * * *